(12) United States Patent
Weller et al.

(10) Patent No.: US 11,179,830 B2
(45) Date of Patent: Nov. 23, 2021

(54) ROOF RACK INSTALLATION TOOL

(71) Applicant: HORIZON GLOBAL AMERICAS INC., Plymouth, MI (US)

(72) Inventors: Matthew O. Weller, South Lyon, MI (US); Brian Wayne Ward, Swartz Creek, MI (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 433 days.

(21) Appl. No.: 16/334,532

(22) PCT Filed: Sep. 21, 2017

(86) PCT No.: PCT/US2017/052715
§ 371 (c)(1),
(2) Date: Mar. 19, 2019

(87) PCT Pub. No.: WO2018/057736
PCT Pub. Date: Mar. 29, 2018

(65) Prior Publication Data
US 2021/0291327 A1     Sep. 23, 2021

Related U.S. Application Data

(60) Provisional application No. 62/397,460, filed on Sep. 21, 2016.

(51) Int. Cl.
*B25B 13/48* (2006.01)
*B25B 23/10* (2006.01)
(Continued)

(52) U.S. Cl.
CPC ............ *B25B 13/48* (2013.01); *B25B 15/008* (2013.01); *B25B 23/101* (2013.01); *B60R 9/04* (2013.01)

(58) Field of Classification Search
CPC ....... B25B 15/00; B25B 15/008; B25B 23/08; B25B 23/10; B25B 23/101; B25B 13/48; B25B 13/06; B60R 9/04
See application file for complete search history.

(56) References Cited

U.S. PATENT DOCUMENTS

| | | | | |
|---|---|---|---|---|
| 657,457 | A | * | 9/1900 | Schneider ............... B25B 23/12 81/451 |
| 3,049,952 | A | * | 8/1962 | Wrigley ................. B25B 13/06 81/439 |

(Continued)

OTHER PUBLICATIONS

Patent Cooperation Treaty (PCT), International Search Report and Written Opinion for Application PCT/US2017/052715 filed Sep. 21, 2017, dated Dec. 14, 2017, International Searching Authority, US.

*Primary Examiner* — David B. Thomas
(74) *Attorney, Agent, or Firm* — McDonald Hopkins LLC

(57) ABSTRACT

An adapter assembly configured to install a roof rack accessory to a vehicle is provided. The roof rack accessory may include a vehicle attachment assembly having a fastener and a locking mechanism. In particular, the adapter assembly may comprise a wrench, an adapter, and a driving sleeve. The adapter engaging with the wrench includes an adapter body that includes first and second engagement portions and a driving post that engages the fastener of the vehicle attachment assembly. The driving sleeve may be engageable with the adapter, wherein the locking mechanism of the vehicle attachment assembly is engaged with the driving sleeve while the fastener of the vehicle attachment assembly is engaged with the adapter.

20 Claims, 7 Drawing Sheets

(51) Int. Cl.
   *B25B 15/00* (2006.01)
   *B60R 9/04* (2006.01)

(56) References Cited

U.S. PATENT DOCUMENTS

| | | | |
|---|---|---|---|
| 5,979,723 | A | 11/1999 | Tress et al. |
| 6,138,538 | A * | 10/2000 | Neijndorff ............. B25B 23/00 81/125 |
| 6,322,279 | B1 | 11/2001 | Yamamoto et al. |
| 8,496,147 | B2 | 7/2013 | Binder et al. |
| 10,625,404 | B2 * | 4/2020 | Chu ................... B25B 23/0035 |
| 2005/0160882 | A1 | 7/2005 | Crow |
| 2013/0026202 | A1 | 1/2013 | Williams |

* cited by examiner

FIG. 1 - PRIOR ART

ROOF RACK INSTALLATION TOOL

CROSS-REFERENCE TO RELATED APPLICATION

The present application is a 35 U.S.C. 371 national stage filing of PCT Application No. PCT/US2017/052715 entitled "ROOF RACK INSTALLATION TOOL" filed on Sep. 21, 2017, which claims the benefit of U.S. Provisional Patent Application No. 62/397,460 entitled "ROOF RACK INSTALLATION TOOL" filed on Sep. 21, 2016 each of which are hereby incorporated by reference in their entirety.

TECHNICAL FIELD

The present invention relates generally to a roof rack installation tool and, more specifically, to a roof rack installation tool incorporating a socket adapter assembly configured to install a roof rack accessory to a vehicle.

BACKGROUND

Accessories are often added to vehicles that were originally manufactured at a separate location by the original vehicle manufacturer. These accessories allow for the customization and personalization of the vehicle to suit the tastes of a particular buyer. The accessories themselves may be shipped separately by the vehicle manufacturer, possibly owing to the production facility for the accessory being in a different location than that of the vehicle itself. In other instances, third parties may market and sell the accessories for post-manufactured installation by a third party. For example, specific accessories may be attached to vehicles after their production based on the location to which they are transported, i.e., the accessories may be country or region specific.

One of the more functional and popular accessories in this regard are roof rack assemblies. Roof rack assemblies may consist of two longitudinal rails disposed on the top of the vehicle. One or more transverse cross bars may fit between the rails. Additional accessories, such as cargo and other specialized carriers, can then be affixed to the rails to improve the cargo carrying capabilities of the vehicle.

In order to limit improper or unauthorized use of substitute parts, roof rack manufacturers often rely on specialized tooling to limit the parts (e.g., rails, cross beams, etc.) that may be added to particular roof rack system or even to limit what roof rack may be attached to which vehicle. These specialized tools rely on specialized shapes and/or engagement of tabs/mechanisms (e.g., depressing a plurality of locking tabs to allow the fastener to be tightened) to create a unique fastener. Insofar as existing, standard torque drivers are only designed to engage a specified fastener size without the capability to engage tabs or other mechanisms, the roof rack manufacturer creates and provides (as part of the roof rack purchase and/or for distribution and use among a selected subset of authorized persons) an appropriate, specialized tool. However, these tools are often susceptible to wear and eventually fail if it is subjected to repeated use/installations.

In scenarios where vehicles and roof racks are separately received at a port of entry and installed by workers at that facility, repeated installations are the norm. An improved tool, that is more resistant to wear and failure, would be welcome in such cases. Further a tool that is designed for use/compatibility with standard sized torque drivers would be welcome.

SUMMARY

The present disclosure demonstrates an adapter assembly configured to install a roof rack accessory to a vehicle. The roof rack accessory may include a vehicle attachment assembly that may include a fastener and a locking mechanism. In particular, the adapter assembly may comprise a wrench, an adapter, and a driving sleeve. The adapter engageable with the wrench includes an adapter body that includes first and second engagement portions and a driving post that engages the fastener of the vehicle attachment assembly. The driving sleeve may be engageable with the adapter, wherein the locking mechanism of the vehicle attachment assembly is engaged with the driving sleeve while the fastener of the vehicle attachment assembly is engaged with the adapter.

Specific reference is made to the appended claims, drawings, and description below, all of which disclose elements of the invention. While specific embodiments are identified, it will be understood that elements from one described aspect may be combined with those from a separately identified aspect. In the same manner, a person of ordinary skill will have the requisite understanding of common processes, components, and methods, and this description is intended to encompass and disclose such common aspects even if they are not expressly identified herein.

BRIEF DESCRIPTION OF THE DRAWINGS

Operation of the present teachings may be better understood by reference to the detailed description taken in connection with the following illustrations. These appended drawings form part of this specification, and any written information in the drawings should be treated as part of this disclosure. In the same manner, the relative positioning and relationship of the components as shown in these drawings, as well as their function, shape, dimensions, and appearance, may all further inform certain aspects of the invention as if fully rewritten herein. In the drawings.

DETAILED DESCRIPTION

Reference will now be made in detail to exemplary embodiments of the present disclosure, examples of which are illustrated in the accompanying drawings. It is to be understood that other embodiments may be utilized and structural and functional changes may be made without departing from the respective scope of this disclosure. As such, the following description is presented by way of illustration only and should not limit in any way the various alternatives and modifications that may be made to the illustrated embodiments and still be within the spirit and scope of the present disclosure.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

The present apparatus and system are particularly useful for rotating/tightening fasteners that require engagement of one or more locking tabs proximate to the fastener head. The system may cooperate with existing, standard sized torque drivers to allow for easy, widespread use.

It is noted that the various embodiments described herein may include other components and/or functionality. It is further noted that while various embodiments refer to a roof rack installation tool, various other systems may be utilized in view of embodiments described herein. Further, the present system may include a variety of components, not limited to the components discussed below. Optionally, the present system may include multiple units of the same components. In an embodiment, the present system may include just the roof rack installation tool described herein. Further, the present system may include components of each of the roof rack installation tools to create a combination of each feature of the various systems.

Figure 1:
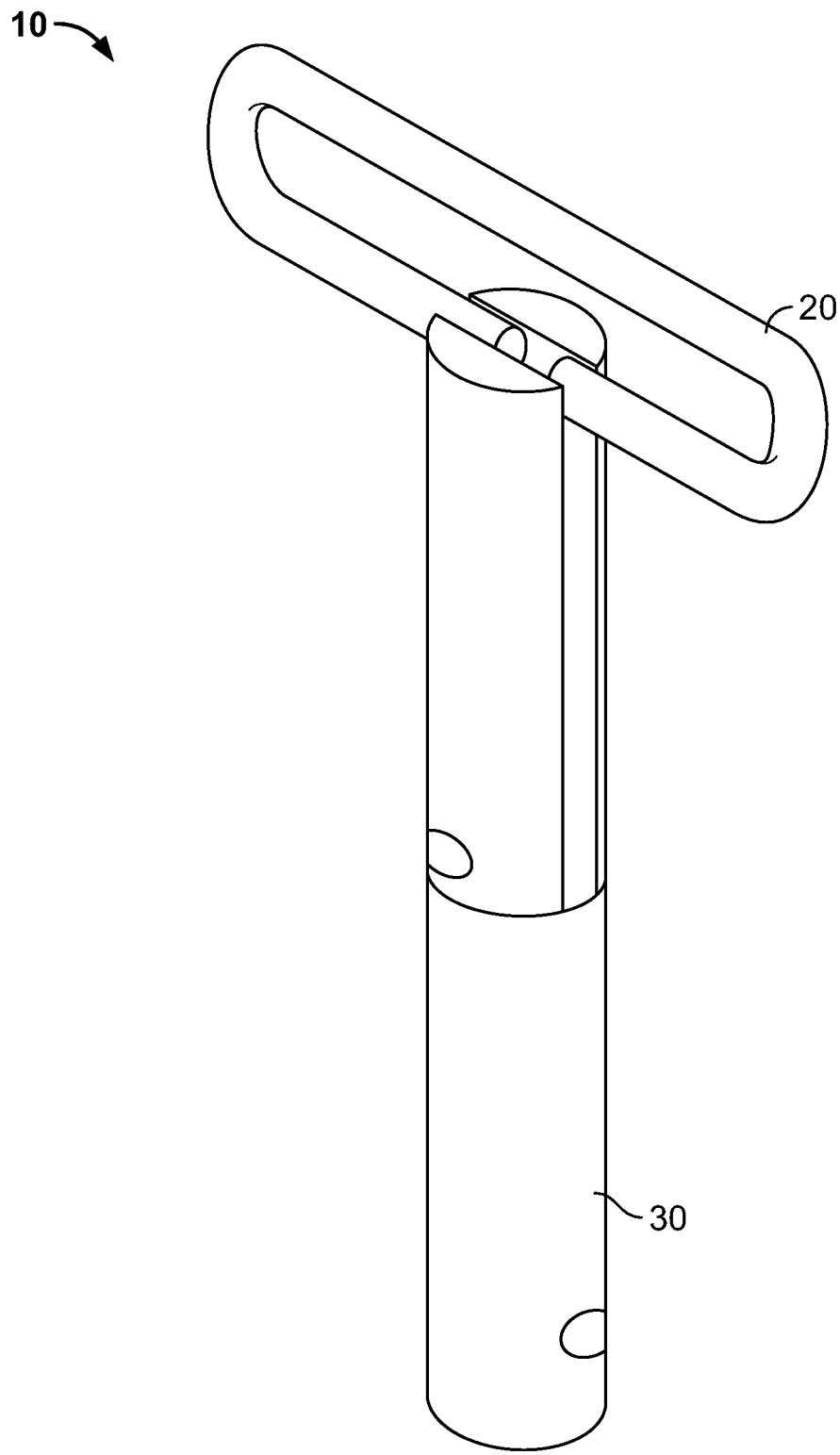
FIG. 1 is a perspective view of a non-limiting example of a roof rack installation tool.

An example of such a tool is shown in FIG. 1. In operation, tool 10 may include a gripping handle 20 at one end. An opposing end 30 may include an Allen-wrench style fastening mechanism and sleeve which engages the locking tabs in the roof rack to allow for manual twisting of the engaged apparatus.

Figure 2:
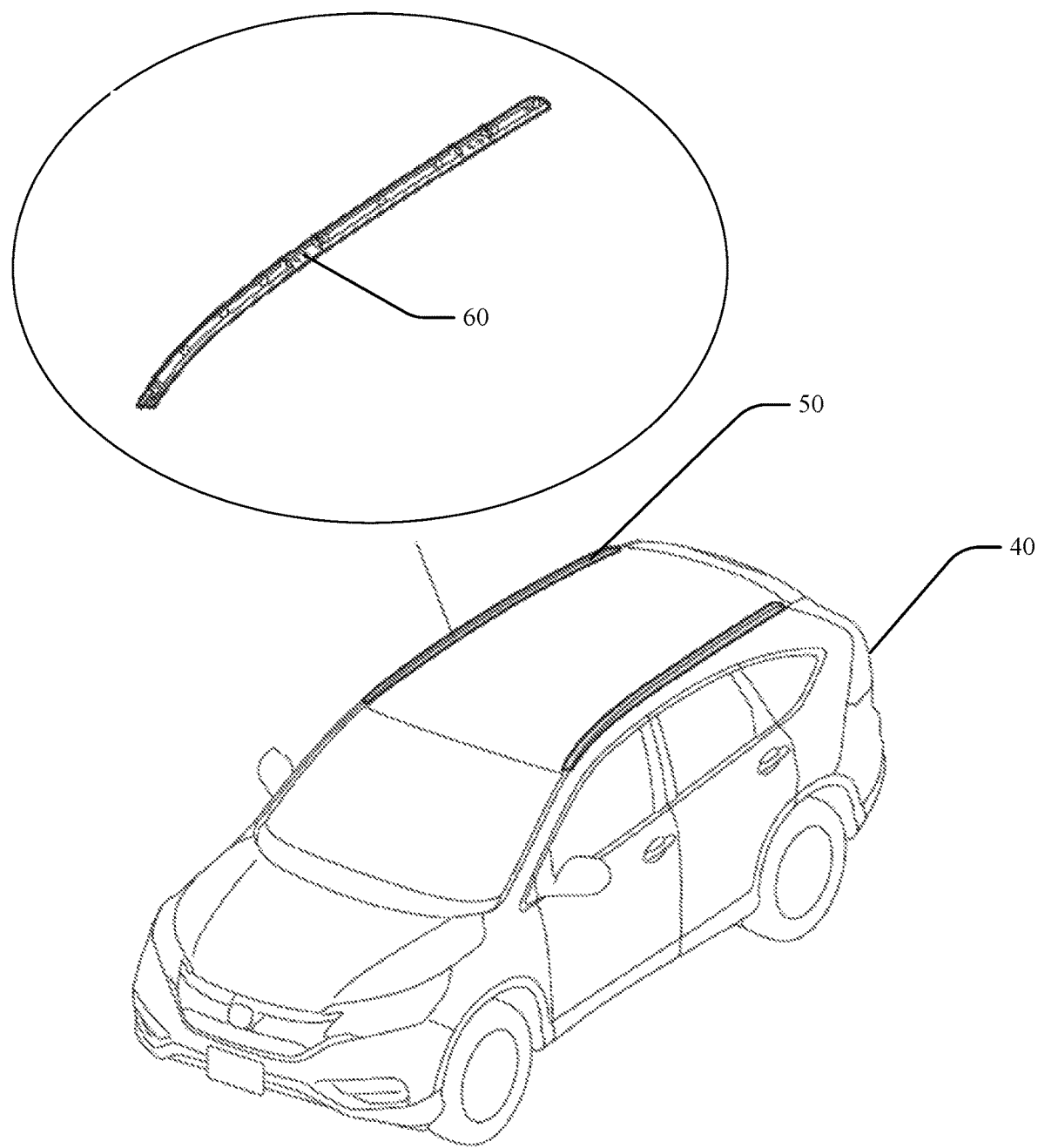
FIG. 2 is a perspective view of a roof rack installed on a vehicle in accordance with various embodiments described herein.

A roof rack 50 may be installed on a vehicle 40. The roof rack 50 may be attached to the vehicle 40 in any appropriate manner, an example of which is shown in FIG. 2. A roof rack installation tool 10 may be used to attach a variety of accessories to the roof rack 50.

Figure 3:
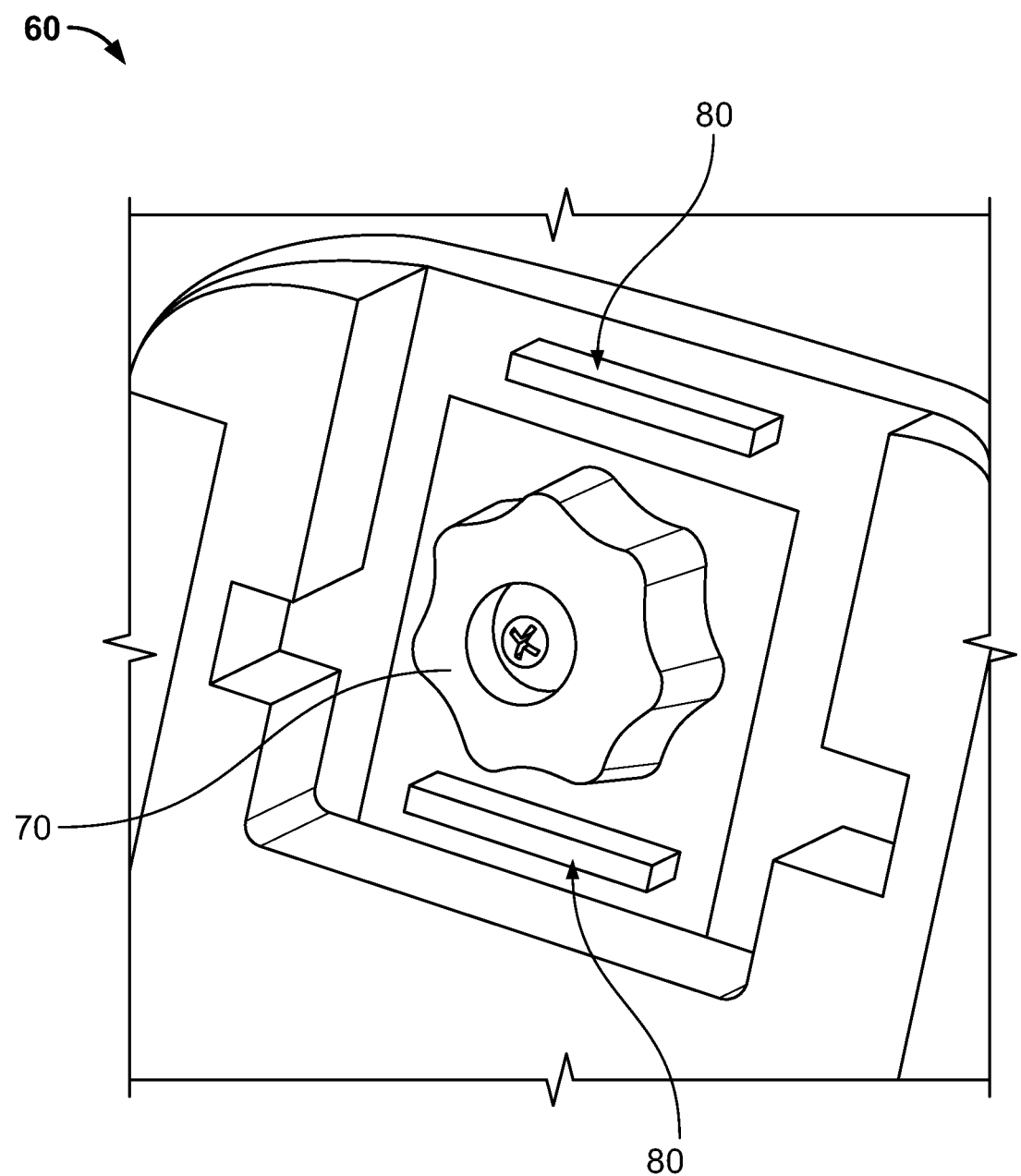
FIG. 3 is a perspective view of a vehicle attachment assembly.

With respect to FIG. 3, a vehicle attachment assembly 60 may include a fastener 70 and locking mechanism 80. The fastener 70 may apply sufficient force to generally hold the vehicle attachment assembly 60 together. The locking mechanism 80 may be formed of metal or other material that may be able to withstand repetitive, high-impact forces, including, without limitation, high strength plastics or rubber. The locking mechanism 80 may include at least one and preferably two locking tabs 88 that may be each angled, bent or dog-leg shaped. Although, the present teachings are not limited to this configuration. Any appropriate number of locking tabs 88 may be utilized, including, without limitation one, two, three, four, etc.

Figure 4:
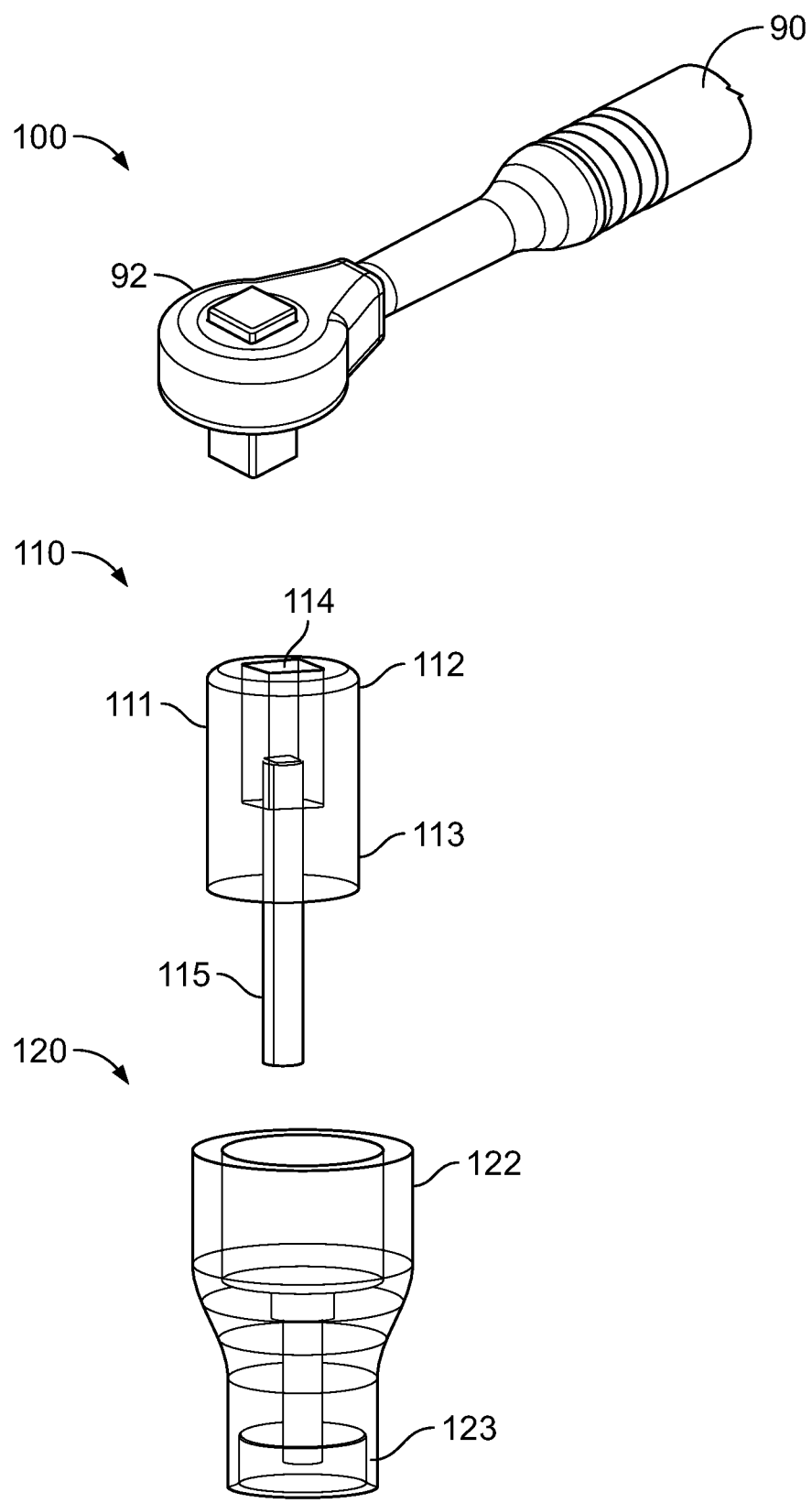
FIG. 4 is a perspective view of a non-limiting example of the roof rack installation tool incorporating a socket adapter assembly in accordance with various embodiments described herein.
Figure 5:
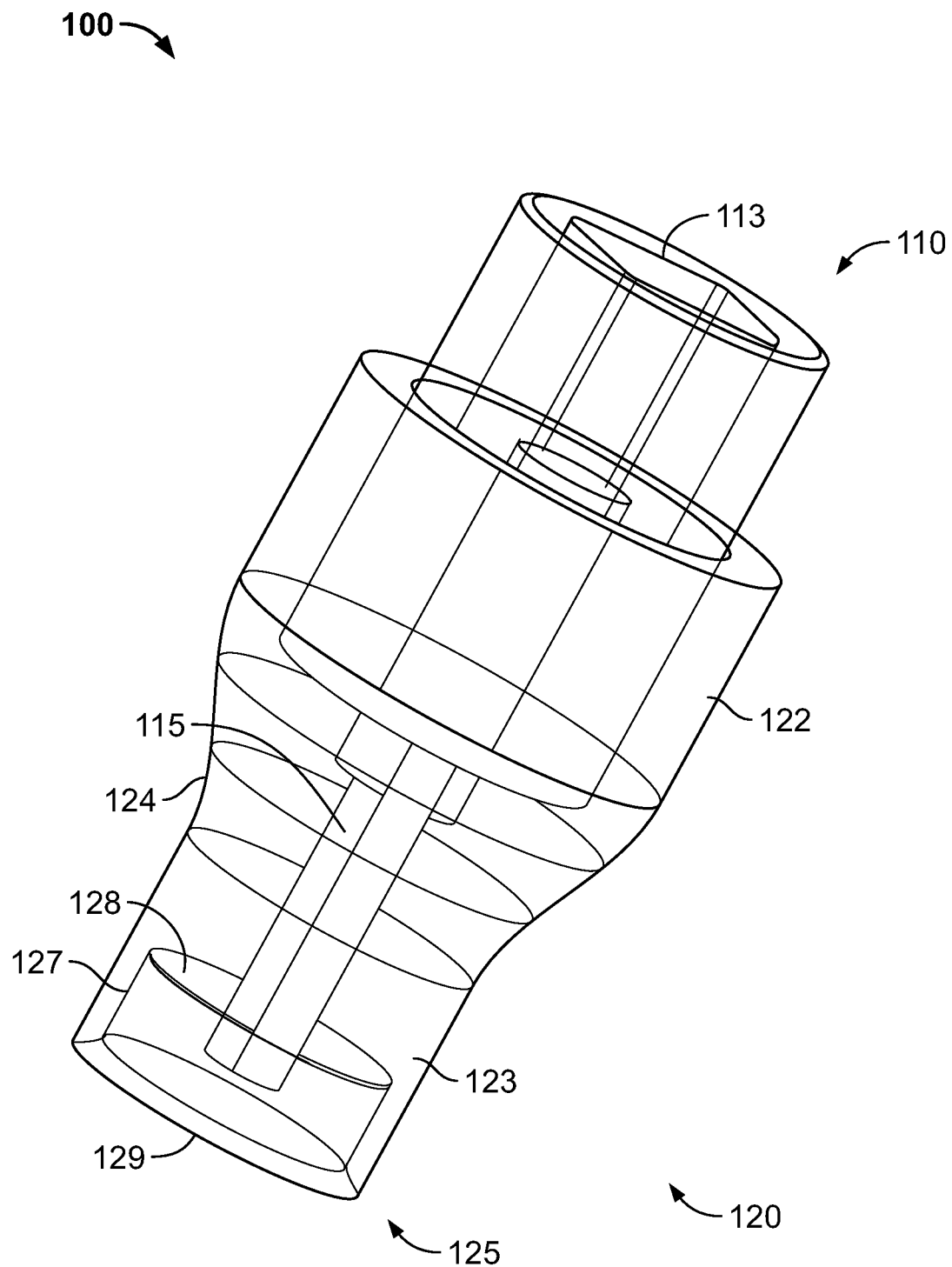
FIG. 5 depicts another perspective view of a non-limiting example of the roof rack installation tool incorporating the socket adapter assembly in a combined position.

The roof rack installation tool 10, shown in FIG. 4, may include a socket adapter assembly 100 of any appropriate configuration. The present teachings are not limited to the configuration of the socket adapter assembly 100 shown. What is shown is merely exemplary. The socket adapter assembly 100 may include an adapter 110 and a driving sleeve 120. Standard torque driver or wrench 90 may be used in combination with the adapter 110 and the driving sleeve 120 of the socket adapter assembly 100. It should be understood, however, that the present teachings should not be limited to the socket adapter assembly 100 being selectively used to install the roof rack 50 to the vehicle 40 as shown in FIGS. 4 and 5. The socket adapter assembly 100 may be selectively used to any appropriate portion of the vehicle 40. Further, the configuration of torque driver or wrench 90 is not limited to that shown. Any configuration of a torque drive or wrench may be utilized with the present teachings. For the sake of brevity, however, only the torque driver or wrench 90 shown is described.

The adapter 110 may include an adapter body 111. In some embodiments, the adapter body 111 may include a first engagement portion 112 and a second engagement portion 113. While two engagement portions 112, 113 are shown in FIGS. 3 and 4, any number of engaging members or portions may be used without departing from the present teachings. The first engagement portion 112 of the adapter body 111 may include a drive-receiving bore 114 that releasably engages with a driving head 92 of torque driver or wrench 90 according to well-established principles. By way of a non-limiting example, the driving head 92 may include a male portion 93 that matingly engages with the drive-receiving bore 114 having a female portion. The driving head 92 may include a selectively engageable locking member to selectively and releasably engage with the drive-receiving bore 114. This locking member may be of any known configuration such as a biasing ball member or a plurality of biasing ball members. Further, the second engagement portion 113 of the adapter body 111 may be designed to engage the driving sleeve 120. In addition, in some embodiments the first and second engaging portions 112, 113 may be of generally different construction. The present teachings are not limited to such.

The exemplary drive-receiving bore 114 shown in FIGS. 4 and 5 may be solid square drives, although other drive shapes are within the scope of the instant disclosure. The size of the drive in the respective drive-receiving bore 114 depends upon the desired application of the roof rack installation tool 10. In the present disclosure the drive-receiving bore 114 may be dimensioned for a ⅜ inch drive, and the drive 90 may be dimensioned to receive a ⅜ drive socket. However, it should be noted that the above dimensions are exemplary, and the scope of the present teachings extends to an adapter having any practical and useful combination of drive sizes.

By way of a non-limiting example, the second engagement portion 113 of the adapter 110 may also include an Allen-wrench style driving post 115. The driving post 115 may be inserted through the driving sleeve 120 and engage directly with and rotate the fastener 70 in the vehicle attachment assembly 60 to accomplish a desired tightening/loosening action. The driving post 115 may be made of any appropriate material, such as by way of non-limiting examples, being made from metal, hard plastics or rubber or a any combination of such. However, the present teachings are not limited to the specific material, the driving post 115 and its components.

In one embodiment, the driving sleeve 120 may receive the second engagement portion 113, such as by way of a non-limiting example, of the adapter 110. In this particular embodiment, the driving sleeve 120 may be graspable by the operator and may generate enough pressure to depress down the locking mechanism 80, while disengaging the fastener 70 from the vehicle attachment assembly 60 by rotation—or while engaging the fastener 70 to the vehicle attachment assembly 60 by rotation. The driving sleeve 120 may be of any appropriate shape and size. Further, the driving sleeve 120 may be formed from any appropriate material, including, without limitation, metal, rubber, plastic or a combination thereof. In some embodiments, the driving sleeve 120 may include an elastomeric outer surface to provide an ergonomic gripping portion for the user.

As illustrated in FIGS. 4-5, the driving sleeve 120 may be generally cylindrically shaped and may include a third engagement portion 122, a fourth engagement portion 123, and a curved portion 124. The third engagement portion 122 of the driving sleeve 120 may have a larger diameter than the fourth engagement portion 123. The fourth engagement portion 123 may be configured to be in contact with or engagement with the locking mechanism 80 located in the roof rack 60 during use thereof.

An engagement mechanism 125 may be formed on the fourth engagement portion 123 of the inside surface of the driving sleeve 120. As shown in FIG. 5, the engagement mechanism 125 may define a reduced diameter of the driving sleeve 120 and may be embodied as an auxiliary insert component 127. In an embodiment, the auxiliary insert component 127 may be used with the selected roof rack of the applicable vehicle types. The driving sleeve 120 may include an inner end 128 defining a incline so that an inside surface of the driving sleeve 120 and an outer end 129 meet at a generally obtuse angle, which may provide for a smooth engagement between the engagement mechanism 125 and the locking mechanism 80. The engagement mechanism 125 may be configured to disengage the locking mechanism 80. In one particular embodiment, the engagement mechanism 125 may receive enough pressure by the operator, via the driving sleeve 120, and release the at least one locking tabs 88, thereby disengaging the locking mechanism 80. For example, the locking tabs 88 may be depressed to disengage from the surface to which to it is otherwise engaged, such as the surface of the roof rack 60. In such embodiments, the engagement mechanism 125 may match the number and location of the locking tabs 88 (such as the two shown in FIG. 3) or otherwise may match the location of the locking tabs 88. The engagement mechanism 125 may push down onto the locking tabs 88 to release them from engagement with the vehicle attachment assembly 60. Such disengagement may allow the operator to additionally disengage the fastener 70 from the vehicle attachment assembly 60 by rotation. Alternatively, the engagement mechanism 125 may be formed as separate, circumferentially-spaced pieces that correspond to the radial configuration of the locking mechanism 80. In some of these embodiments, the locking tabs 88 may engage a portion of the vehicle attachment assembly 60, which may prevent rotation or prevent at least a portion of the rotation of the fastener 70. Disengaging the locking tabs 88 by use of the engagement mechanism 125 may allow the fastener 70 to rotate freely to be engaged with or disengaged from the vehicle attachment assembly 60.

The engagement mechanism 125 may provide a custom fit installation tool for the roof rack of substantially any type of vehicle. The engagement mechanism 125 according to the present disclosure may be significantly universal and may be adapted to a wide variety of roof racks of many different vehicle types and models.

The auxiliary insert component 127 may be of any appropriate or mating configurations to operatively fit within the driving sleeve 120. The auxiliary insert component 1270 may also be positioned such that it may mate with various different types or configurations of the locking mechanism 80. This may allow a user to use a previously purchased adapter for various vehicles, such as for a new vehicle or new vehicle model.

In some embodiments, one part number may be used to fit two or more auxiliary insert components 127. One stocking number may further be used for multiple applications for manufacturing, warehousing, and/or customer stocking.

In summary, numerous benefits result from employing the concepts of the present disclosure and many of these benefits are demonstrated herein. The socket adapter assembly 100 incorporates a novel assembly incorporating the adapter 110 and the driving sleeve 120 that may provide operative engagement with a fastener 70 of the vehicle attachment assembly 60 so that the roof rack installation would have easier access and secure connection.

As show in FIG. 5, the driving sleeve 120 may include the curved portion 124. The curved portion 124 may be configured to assist the driving post 115 to pass from the separated position to the combined position—it may engage and disengage the fastener 70. The curved portion 124 may be of a similar shape to that of the adapter body 111. In particular, the curved portion 124 may engage the minor diameter of the adapter body 111 or more specifically, the second outer surface 104 of the adapter body 111. The adapter 110 may allow the operator to operatively align and connect the fastener 70 of the roof rack of the vehicle to the driving post 115 of the adapter 110.

Figure 6:
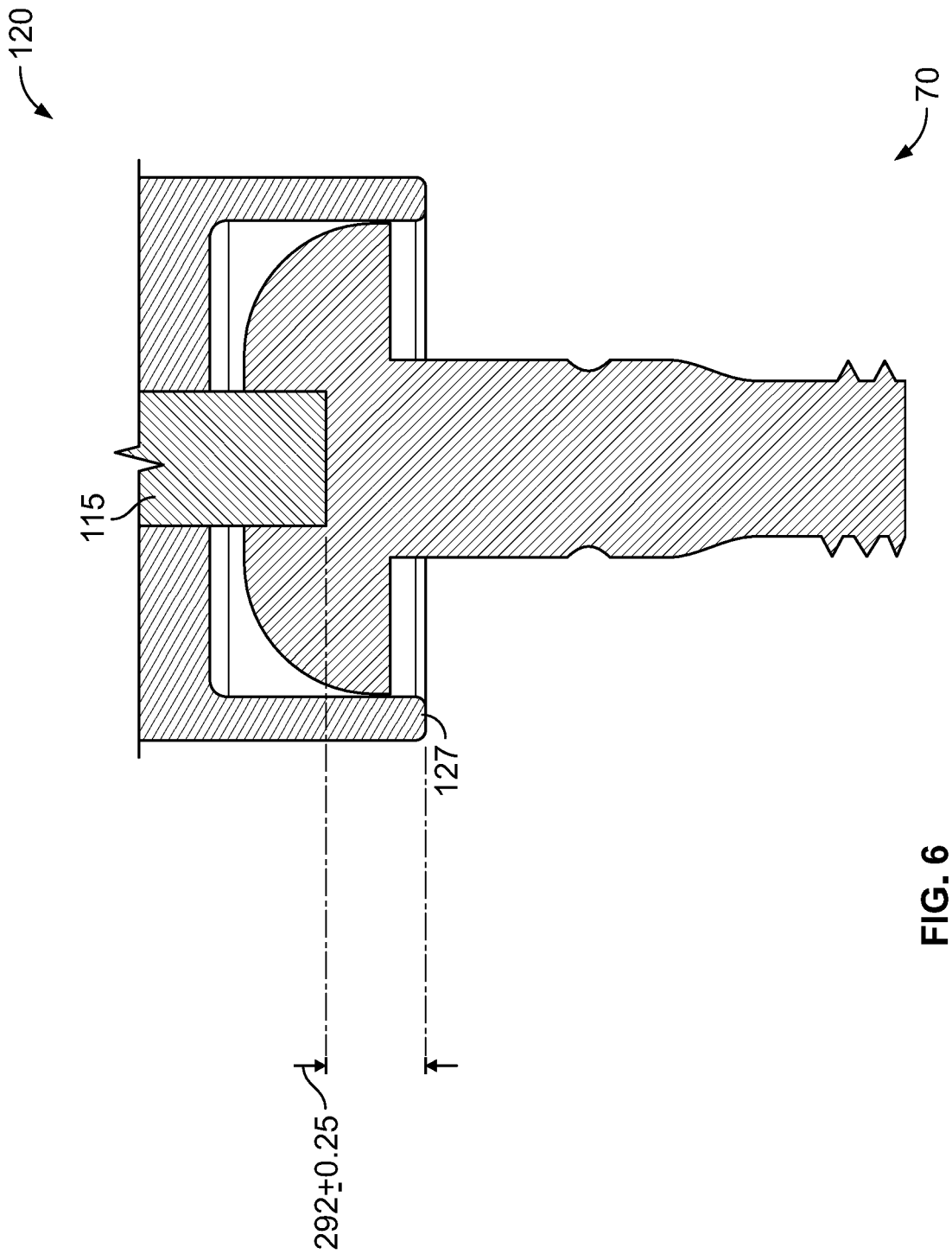
FIG. 6 is a cross-sectional view of a non-limiting example of the roof rack installation tool incorporating the socket adapter assembly in the combined position.

By way of a non-limiting example, the adapter 110 may engage the driving sleeve 120 fully as in the combined position, such as shown in FIG. 6. In this particular embodiment, a common depth between the bottom of the driving post 115 and the bottom of the auxiliary insert component 127 may be from about 2.67 inch to about 3.17 inch and in particular about 2.92 inch. The common depth may allow an operative engagement between the driving post 115 of the adapter 110 and the fastener 70. This may, therefore, allow the operator to unfasten, such as through rotation, the fastener 70.

Figure 7:
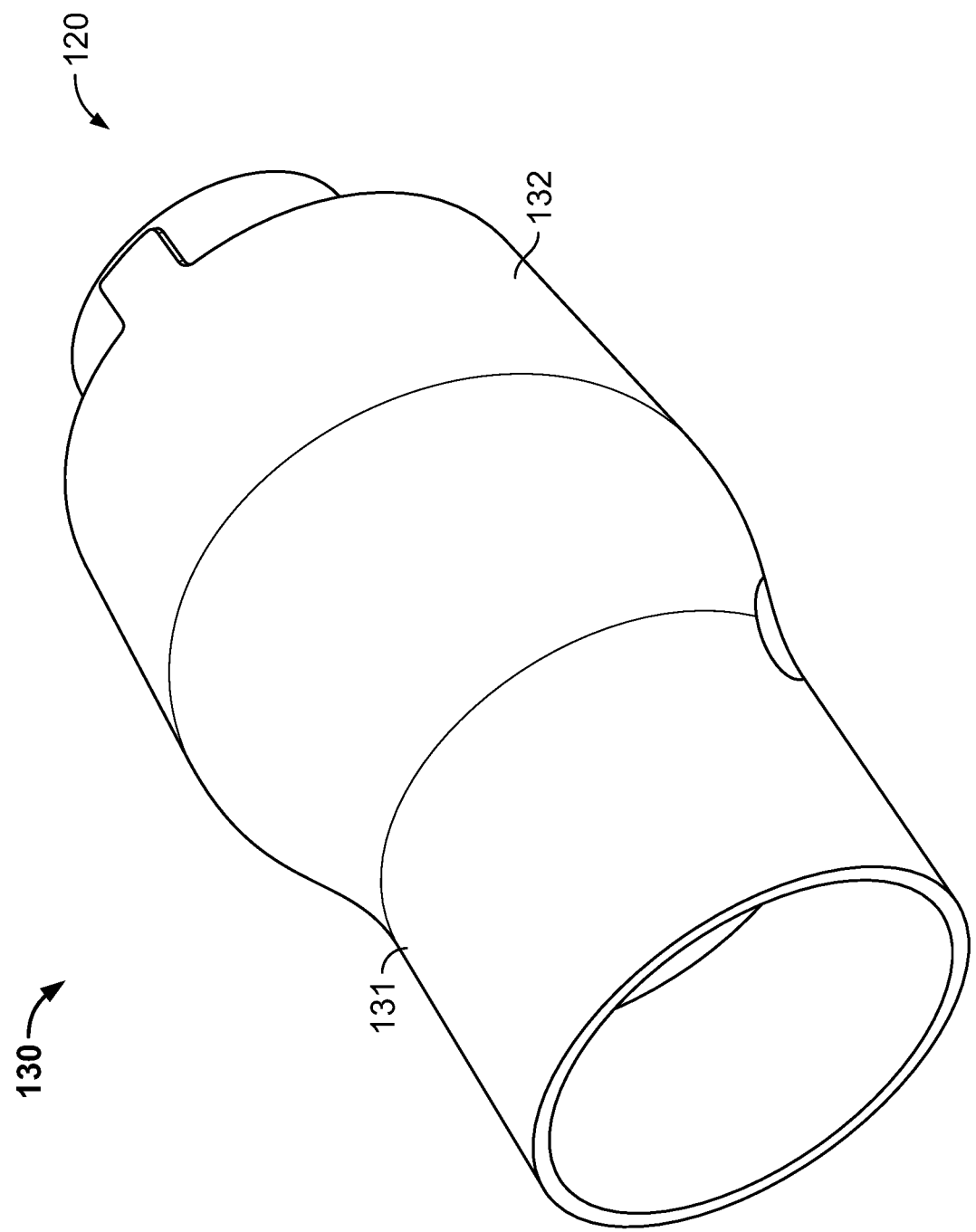
FIG. 7 is a perspective view of a non-limiting example of the roof rack installation tool incorporating the socket adapter assembly with a grip.

With respect to FIG. 7, the driving sleeve 120 may further have a grip 130. The grip 130 may be another sleeve 131 selectively engageable with the driving sleeve 120. The grip 130 may be a knurled pattern disposed on the driving sleeve 120. Alternatively, the grip 130 may be of any configuration that assists the user to grasp the driving sleeve 120. By way of a non-limiting example, the grip 130 may include bumps, grooves, slots, raised surfaces or depressed surfaces that assist the user in gripping the driving sleeve 120. Further, the grip 130 may be of any appropriate shape or size, such as having a generally tubular, square, rectangular, or the like shape. The grip 130 may be manufactured of any appropriate material such as an elastomeric material or a combination of elastomeric material and metal or a hard rubber or plastic.

By way of a non-limiting example, the grip 130 may also be a solid shell with a texture and/or a color. The grip 130 may be made of a weather, ultra violet (UV) and/or shatter resistant polymer such as ABS and polycarbonate. The grip 130 may have a gripping surface 132 thereon having an ornamental shape made with precision molding contours thereon. These shapes may help the user grip the driving sleeve. The gripping surface 132 of the grip 130 may be externally facing to allow a user to grasp the grip 130 and rotate the fastener relative to the locking mechanism 80. The gripping surface 132 may be made by over-molding including insert molding, double shot molding, co-injection molding as well as hot stamping for a decorative finish and sonic welding for attachment of various features. However, the grip 130 may be made of any appropriate materials and colors and this disclosure is not limited in this regard.

Further, the various embodiments may be combined to be utilized as an installation tool. Any combinations of the embodiments disclosed above are contemplated to be utilized together. For the sake of brevity, not every combination is described in detail, but all such combinations are contemplated by this disclosure.

Although the present embodiments have been illustrated in the accompanying drawings and described in the foregoing detailed description, it is to be understood that the invention is not to be limited to just the embodiments disclosed, and numerous rearrangements, modifications and substitutions are also contemplated. The exemplary embodiment has been described with reference to the preferred embodiments, but further modifications and alterations encompass the preceding detailed description. These modifications and alterations also fall within the scope of the appended claims or the equivalents thereof

What is claimed is:

1. An adapter assembly configured to install an accessory to a vehicle, the accessory having a fastener and a locking mechanism, the adapter assembly comprising:
    an adapter body comprising first and second engagement portions;
    a driving post selectively engageable with the fastener; and
    a driving sleeve selectively engaged with the adapter body, wherein the locking mechanism of the vehicle attachment assembly is engaged with the driving sleeve while the fastener of the vehicle attachment assembly is engaged with the adapter.

2. The adapter assembly of claim 1, wherein the first engagement portion of the adapter body includes a drive-receiving bore.

3. The adapter assembly of claim 2, wherein the drive-receiving bore releasably engages with a driving head of a wrench.

4. The adapter assembly of claim 1, wherein the second engagement portion includes the driving post.

5. The adapter assembly of claim 1, wherein the driving post inserts through the driving sleeve.

6. The adapter assembly of claim 1, wherein the driving post engages directly with the fastener of the vehicle attachment assembly.

7. The adapter assembly of claim 1, wherein the driving sleeve includes a curved portion with a similar shape to that of the adapter body.

8. The adapter assembly of claim 1, wherein the driving sleeve includes an insert.

9. The adapter assembly of claim 1, further comprising a grip selectively engageable with the driving sleeve.

10. The adapter assembly of claim 9, wherein the grip is a pattern disposed on the driving sleeve.

11. A system comprising:
    a fastener configured to securely install a vehicle attachment assembly to a vehicle;
    a locking mechanism configured to prevent rotation of the fastener; and
    a tool securely engageable with the fastener and the locking mechanism, the tool comprising:
        a wrench;
        an adapter engageable with the wrench, the adapter comprising:
            an adapter body including first and second engagement portions; and
            a driving post engageable with the fastener; and
        a driving sleeve selectively engageable with the adapter, wherein the locking mechanism is engaged with the driving sleeve when the fastener is engaged with the adapter.

12. The system of claim 11, further including an insert engaged with the locking mechanism.

13. The system of claim 11, wherein the driving sleeve includes a curved portion with a similar shape to that of the adapter body.

14. The system of claim 11, further comprising a grip selectively engageable with the driving sleeve.

15. The system of claim 14, wherein the grip is a pattern disposed on the driving sleeve.

16. The system of claim 11, wherein the locking mechanism comprises at least one tab whereby the driving sleeve is selectively engageable with the at least one tab to disengage the at least one tab.

17. The system of claim 11, wherein the driving sleeve is selectively engageable with the second engagement portion of the adapter body.

18. A system comprising:
    a fastener configured to secure a vehicle attachment assembly to a vehicle;
    a locking mechanism configured to prevent rotation of the fastener;
    an adapter body including first and second engagement portions; and
    a driving post engageable with the fastener of the vehicle attachment assembly; and
    a driving sleeve, the driving sleeve engageable with the adapter body, wherein the locking mechanism is engaged with the driving sleeve while the fastener is engaged with the adapter.

19. The system of claim 18, wherein the locking mechanism comprises at least one tab whereby engagement of the driving sleeve with the at least one tab disengages the at least one tab.

20. The system of claim 18 further comprising a wrench selectively engageable with the adapter body.

* * * * *